US012412714B2

(12) United States Patent
Hofsaess

(10) Patent No.: US 12,412,714 B2
(45) Date of Patent: Sep. 9, 2025

(54) TEMPERATURE-DEPENDENT SWITCHING MECHANISM AND TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 128 days.

(21) Appl. No.: 18/356,689

(22) Filed: Jul. 21, 2023

(65) Prior Publication Data

US 2024/0029975 A1 Jan. 25, 2024

(30) Foreign Application Priority Data

Jul. 22, 2022 (DE) ......................... 102022118405.6

(51) Int. Cl.
*H01H 37/54* (2006.01)

(52) U.S. Cl.
CPC . *H01H 37/5427* (2013.01); *H01H 2037/5472* (2013.01); *H01H 2037/5481* (2013.01); *H01H 2037/549* (2013.01)

(58) Field of Classification Search
CPC ....... H01H 37/5427; H01H 2037/5472; H01H 2037/5481; H01H 2037/549; H01H 37/04; H01H 37/5409
See application file for complete search history.

(56) References Cited

U.S. PATENT DOCUMENTS 4,306,211 A 12/1981 Hofsäss
5,515,229 A * 5/1996 Takeda ................. H01H 71/123 361/26

(Continued)

FOREIGN PATENT DOCUMENTS

DE 72 29 393 U 11/1972
DE 2917482 A1 11/1980

(Continued)

OTHER PUBLICATIONS

Examination Report Issued in DE 102022118405.6 dated Jan. 24, 2023, in 7 pages.

(Continued)

*Primary Examiner* — Stephen S Sul
(74) *Attorney, Agent, or Firm* — Knobbe Martens Olson & Bear LLP

(57) ABSTRACT

A temperature-dependent switching mechanism for a temperature-dependent switch, having a temperature-dependent bimetal snap-action disc, a temperature independent snap-action spring disc, an electrically conductive contact member to which the bimetal snap-action disc and the snap-action spring disc are captively held, so that the bimetal snap-action disc, the snap-action spring disc and the contact member form a switching mechanism unit captively held together, and a switching mechanism housing which captively holds the switching mechanism unit. The switching mechanism housing surrounds the switching mechanism unit from a first housing side, a second housing side opposite the first housing side, and a housing peripheral side extending between and transverse to the first and second housing sides. The switching mechanism housing is configured as an at least partially open housing and includes an opening on the first housing side through which the contact member is accessible from outside the switching mechanism housing.

20 Claims, 4 Drawing Sheets

(56) References Cited

U.S. PATENT DOCUMENTS

| | | | | |
|---|---|---|---|---|
| 5,973,587 A * | 10/1999 | Hofsass | H01H 37/5427 337/377 |
| 6,724,293 B1 | 4/2004 | Hofsäss | |
| 9,335,801 B2 | 5/2016 | Chuang et al. | |
| 10,256,061 B2 | 4/2019 | Neumann | |
| 10,439,196 B2 | 10/2019 | Bourns et al. | |
| 10,985,552 B2 | 4/2021 | Tada et al. | |
| 11,004,634 B2 | 5/2021 | Namikawa | |
| 11,239,037 B2 | 2/2022 | Namikawa | |
| 11,329,325 B2 | 5/2022 | Namikawa | |
| 11,373,826 B2 | 6/2022 | Namikawa | |
| 11,476,066 B2 | 10/2022 | Hofsäess | |
| 11,551,895 B2 | 1/2023 | Namikawa | |
| 11,615,930 B2 | 3/2023 | Namikawa | |
| 11,636,991 B2 | 4/2023 | Miyata | |
| 11,651,922 B2 | 5/2023 | Tada et al. | |
| 2013/0127585 A1 | 5/2013 | Hofsaess | |
| 2013/0127586 A1* | 5/2013 | Hofsaess | H01H 1/58 337/365 |
| 2015/0061818 A1* | 3/2015 | Klaschewski | H01H 37/5427 337/343 |
| 2015/0109092 A1* | 4/2015 | Neumann | H01H 37/54 337/365 |
| 2015/0364284 A1* | 12/2015 | Mitschele | H01H 1/58 337/111 |
| 2020/0234898 A1 | 7/2020 | Namikawa | |
| 2021/0090832 A1* | 3/2021 | Hofsaess | H01H 37/5427 |
| 2024/0029974 A1* | 1/2024 | Hofsaess | H01H 37/5427 |
| 2024/0212961 A1* | 6/2024 | Hofsaess | H01H 37/54 |

FOREIGN PATENT DOCUMENTS

| | | | |
|---|---|---|---|
| DE | 19919648 | A1 | 12/2000 |
| DE | 102007014237 | A1 | 9/2008 |
| DE | 102013017232 | A1 | 4/2015 |
| DE | 102019125453 | A1 | 3/2021 |
| GB | 1394612 | A | 5/1975 |
| WO | WO 2010/139781 | | 12/2010 |

OTHER PUBLICATIONS

Notification of Reasons for Rejection dated Jun. 11, 2024 in Japanese Application No. 2023-109142, 15 pages.

EP Search Report for Application No. EP 23186037 dated Dec. 20, 2023.

* cited by examiner

TEMPERATURE-DEPENDENT SWITCHING MECHANISM AND TEMPERATURE-DEPENDENT SWITCH

CROSS-REFERENCE TO RELATED APPLICATIONS

This application claims priority from German patent application DE 10 2022 118 405.6, filed on Jul. 22, 2022. The entire content of this priority application is incorporated herein by reference.

BACKGROUND

This disclosure relates to a temperature-dependent switching mechanism for a temperature-dependent switch. The disclosure further relates to a temperature-dependent switch comprising such a temperature-dependent switching mechanism.

An exemplary temperature-dependent switch is disclosed in DE 10 2011 119 632 B3.

Such temperature-dependent switches are used in a principally known manner to monitor the temperature of a device. For this purpose, the switch is brought into thermal contact with the device to be protected, e.g. via one of its outer surfaces, so that the temperature of the device to be protected influences the temperature of the switching mechanism arranged inside the switch.

The switch is typically connected electrically in series into the supply circuit of the device to be protected via connecting leads, so that below the response temperature of the switch, the supply current of the device to be protected flows through the switch.

In the switch disclosed in DE 10 2011 119 632 B3, the switching mechanism is arranged inside a switch housing. The switch housing is formed in two parts. It comprises a lower part that is firmly connected to a cover part with an insulating foil interposed therebetween. The temperature-dependent switching mechanism arranged in the switch housing comprises a snap-action spring disc to which a movable contact member is attached, and a bimetal snap-action disc imposed on the movable contact member. The snap-action spring disc presses the movable contact member against a stationary counter contact arranged on the inside of the switch housing on the cover part. The outer edge of the snap-action spring disc is supported in the lower part of the switch housing so that the electrical current flows from the lower part through the snap-action spring disc and the movable contact member into the stationary counter contact and from there into the cover part.

The temperature-dependent bimetal snap-action disc is essentially responsible for the temperature-dependent switching behavior of the switch. This is usually configured as a multilayer, active, sheet-metal component composed of two, three or four interconnected components with different thermal expansion coefficients. In such bimetal snap-action discs, the individual layers of metals or metal alloys are usually joined by material bonding or positive locking, for example by rolling.

Such a bimetal snap-action disc has a first stable geometric configuration (low-temperature configuration) at low temperatures, below the response temperature of the bimetal snap-action disc, and a second stable geometric configuration (high-temperature configuration) at high temperatures, above the response temperature of the bimetal snap-action disc. The bimetal snap-action disc snaps from its low-temperature configuration to its high-temperature configuration in a temperature-dependent manner in the manner of a hysteresis.

Thus, if the temperature of the bimetal snap-action disc rises above the response temperature of the bimetal snap-action disc as a result of a temperature increase in the device to be protected, the latter snaps from its low-temperature configuration to its high-temperature configuration. Thereby, the bimetal snap-action disc works against the snap-action spring disc in such a way that it lifts the movable contact member from the stationary counter contact, so that the switch opens and the device to be protected is switched off and cannot heat up any further.

Unless a reset lock is provided, the bimetal snap-action disc snaps back to its low-temperature configuration so that the switch is closed again as soon as the temperature of the bimetal snap-action disc drops below the so-called snap-back temperature of the bimetal snap-action disc as a result of the cooling of the device to be protected.

In its low-temperature configuration, the bimetal snap-action disc is preferably mounted in the switch housing in a mechanically force-free manner, and the bimetal snap-action disc is also not used to carry the current. This has the advantage that the bimetal snap-action disc has a longer service life and that the switching point, i.e. the response temperature of the bimetal snap-action disc, does not change even after many switching cycles.

In the case of a large number of temperature-dependent switches, the bimetal snap-action disc is therefore preferably inserted as a loose individual part in the switch housing during manufacture of the switch, wherein the bimetal snap-action disc is imposed on the contact member attached to the spring snap-action disc, for example with a central through hole provided therein. Only when the switch housing is closed is the bimetal snap-action disc then fixed in position and its position relative to the other components of the switching mechanism determined. However, the production of such a switch in which the bimetal snap-action disc is inserted individually has proved to be relatively cumbersome, as several steps are required to insert the switching mechanism into the switch housing.

In the switch disclosed in DE 10 2011 119 632 B3, the bimetal snap-action disc is therefore connected in advance (outside the switch housing) to the contact member attached to the snap-action spring disc. For this purpose, the bimetal snap-action disc is imposed on the contact member and then an upper collar of the contact member is folded down. As a result, not only is the snap-action spring disc attached to the contact member, but the bimetal snap-action disc is also held captive on the latter.

The switching mechanism, which is composed of the bimetal snap-action disc, the spring snap-action disc and the contact member, can thus be manufactured in advance as a semi-finished product that forms a captive unit and can be kept separately in stock as bulk material. When the switch is manufactured, the switching mechanism can then be inserted into the switch housing as a captive unit in a single work step. This simplifies the production of the switch many times over.

In the switch disclosed in DE 10 2011 119 632 B3, the snap-action spring disc is welded or soldered to the contact member in order to establish the best possible electrical contact between the two components. However, it has been shown that, in particular during bulk storage of the switching mechanism prefabricated as a semi-finished product, the welding and soldering device between the contact member and the snap-action spring disc can break. Such defective switches can then of course no longer be used. A particular problem here is that such a defect can only be detected after the switch has been assembled, as only then is it possible to perform a functional test of the switch.

DE 199 19 648 A1 also proposes a temperature-dependent switch whose switching mechanism can be produced in advance as a semi-finished product. In this switching mechanism, too, the bimetal snap-action disc, the snap-action spring disc and the contact member already form a captive unit before installation in the switch housing, which can be inserted into the switch housing as a whole during production of the switch and can be kept in stock in advance as bulk material. In this switching mechanism, the contact member has a sheath of softer metal and a core of electrically conductive, harder metal. The bimetal snap-action disc and snap-action spring disc are fitted to the sheath and molded into the softer metal of the sheath. However, it has been found that this type of connection often leads to unintentional detachment of the bimetal snap-action disc and/or the snap-action spring disc from the contact member during storage of the switching mechanism.

A further possibility of pre-manufacturing the switching mechanism as a semi-finished product is disclosed in DE 29 17 482 A1 and DE 10 2007 014 237 A1. The captive unit of the switching mechanism is achieved by connecting the bimetal snap-action disc and the spring snap-action disc with each other via a rivet. Depending on the design of the switch, this rivet can also form the movable contact member of the switching mechanism. The rivet is composed of two parts and comprises a rivet bolt cooperating with a hollow rivet or a rivet bolt with a counterholder attached to it.

While this type of riveted connection between the snap-action spring disc and the bimetal snap-action disc has proven to be a mechanically long-term resistant connection, the riveted connection does, however, lead to other disadvantages. For example, the bimetal snap-action disc is usually fixed to the rivet, which can lead to deformation and thus to malfunctions of the bimetal snap-action disc. Overall, therefore, storage of the switching mechanism in the form of bulk material is also possible here in principle. However, damage to the switching mechanism during bulk storage cannot be ruled out here either.

SUMMARY

It is an object to provide a temperature-dependent switching mechanism which can be prefabricated as a semi-finished product and can be kept in stock as bulk material without being susceptible to damage which leads to a defect in the switching mechanism. The switching mechanism prefabricated as a semi-finished product should then also be as easy as possible to use in a temperature-dependent switch and enable its manufacture with as few work steps as possible. In addition, it should be possible to perform a functional test of the switching mechanism before it is installed in the switch.

According to a first aspect, a temperature-dependent switching mechanism is presented, having:

- a temperature-dependent bimetal snap-action disc;
- a temperature-independent snap-action spring disc;
- an electrically conductive contact member to which the bimetal snap-action disc and the snap-action spring disc are captively held, so that the bimetal snap-action disc, the snap-action spring disc, and the contact member form a switching mechanism unit captively held together; and
- a switching mechanism housing in which the switching mechanism unit is arranged and which captively holds the switching mechanism unit;
- wherein the switching mechanism housing at least partially surrounds the switching mechanism unit from a first housing side, a second housing side opposite the first housing side, and a housing peripheral side extending between and transverse to the first and second housing sides, and
- wherein the switching mechanism housing is configured as an at least partially open housing and comprises an opening on the first housing side through which the contact member is accessible from outside the switching mechanism housing.

According to a second aspect, a temperature-dependent switch is presented, comprising:

- a temperature-dependent switching mechanism; and
- a switch housing surrounding the temperature-dependent switching mechanism and comprising a first contact and a second contact;

wherein the temperature-dependent switching mechanism comprises:

- a temperature-dependent bimetal snap-action disc;
- a temperature-independent snap-action spring disc;
- an electrically conductive contact member to which the bimetal snap-action disc and the snap-action spring disc are captively held, so that the bimetal snap-action disc, the snap-action spring disc, and the contact member form a switching mechanism unit captively held together; and
- a switching mechanism housing in which the switching mechanism unit is arranged and which captively holds the switching mechanism unit;

wherein the switching mechanism housing surrounds the switching mechanism unit from a first housing side, a second housing side opposite the first housing side, and a housing peripheral side extending between and transverse to the first and second housing sides, wherein the switching mechanism housing is configured as an at least partially open housing and comprises an opening on the first housing side through which the contact member is accessible from outside the switching mechanism housing; and wherein the temperature-dependent switching mechanism is configured to establish an electrical connection between the first contact and the second contact below a response temperature of the bimetal snap-action disc and to interrupt the electrical connection upon exceeding the response temperature.

Thus, the switching mechanism includes an additional switching mechanism housing in which the switching mechanism unit, which comprises the bimetal snap-action disc, the snap-action spring disc and the contact member, is held captive but with clearance.

Similar to the prior art cited at the outset, the bimetal snap-action disc, the snap-action spring disc and the contact member form a captive switching mechanism unit that can be prefabricated as a semi-finished product before being inserted into a temperature-dependent switch.

However, this switching mechanism unit is now additionally surrounded by a switching mechanism housing so that the fragile components of the switching mechanism, in particular the bimetal snap-action disc and the snap-action spring disc, are protected by the switching mechanism housing during bulk storage. Damage to these fragile components during bulk storage is thus largely prevented, as the fragile components of the switching mechanism are securely encapsulated in this switching mechanism housing.

The switching mechanism housing not only offers the advantage of safekeeping of the fragile switching mechanism components during bulk storage, it also enables a much simpler way of manufacturing the temperature-dependent switch in which the switching mechanism will later be used.

Unlike a conventional switch housing, the now additionally provided switching mechanism housing is not a closed housing in which the switching mechanism is hermetically sealed, but a partially open housing that comprises an opening on the first housing side through which the contact member is accessible from outside the switch housing. The switching mechanism together with the switching mechanism housing can thus be inserted as a unit into a simplified switch outer housing, which forms the final switch housing. A counter contact can be arranged on this switch outer housing, which counter contact interacts with the contact member of the switching mechanism that is accessible from the outside. A modification or further processing of the switching mechanism housing is not necessary.

In the manufacture of the temperature-dependent switch, the switching mechanism together with the switching mechanism housing can therefore first be prefabricated as a semi-finished product and then inserted as a whole into a switch outer housing. This not only simplifies the storage of the switch, but also the manufacture of the temperature-dependent switch many times over.

Since all components of the switch are already arranged ready for operation on the switching mechanism, which is prefabricated as a semi-finished product, the switch housing surrounding the switching mechanism housing only has to comprise two contacts which are electrically connected to each other via the switching mechanism. Further complex components need not be provided on the switch housing. It is thus also possible to insert the switching mechanism directly into an external switch housing, which is integral with the device to be monitored and has a much simpler design than conventional switch housings that hermetically seal the switching mechanism. However, it is of course also possible to insert the switching mechanism together with its switching mechanism housing into a conventional switch housing, as is known, for example, from DE 10 2011 119 632 B3.

A further advantage of the presented switching mechanism is that it can be functionally tested before it is installed in the switch or switch housing. Due to the switch housing now provided, in which the switching mechanism unit is encapsulated, the snap-action behavior of the bimetal snap-action disc can already be tested in the switch housing.

Preferably, the second housing side and the housing peripheral side are each configured as closed housing sides and only the first housing side is configured as a partially open housing side (due to the opening provided thereon).

According to a refinement, the contact member permanently protrudes outwardly through the opening or is movable together with the bimetal snap-action disc and the snap-action spring disc within the switching mechanism housing such that the contact member protrudes outwardly through the opening upon corresponding movement within the switching mechanism housing.

This guarantees easy access to the contact member from outside the switching mechanism housing. In particular, this simplifies the electrical connection and contacting of the switching mechanism. The contact member is thus at least partially directly accessible from the outside, so that the switch housing of the switch to be ultimately manufactured only needs to have a first contact, which is electrically connected to the switch housing, and a second contact, which acts as a counter contact to the contact member of the switching mechanism.

As mentioned above, the disclosure relates not only to the temperature-dependent switching mechanism itself, but also to a temperature-dependent switch which, in addition to the temperature-dependent switching mechanism, comprises an outer switch housing surrounding the switching mechanism and comprising a first contact and a second contact, wherein the switching mechanism is configured to establish an electrical connection between the first and second contacts below a response temperature of the bimetal snap-action disc and to interrupt the electrical connection upon exceeding the response temperature.

According to a further refinement of the temperature-dependent switching mechanism, a diameter of the opening is smaller than a diameter of the bimetal snap-action disc measured parallel thereto and/or smaller than a diameter of the snap-action spring disc measured parallel thereto.

The switching mechanism unit, which comprises the bimetal snap-action disc, the snap-action spring disc and the contact member, is thus held captive in the switching mechanism housing in a simple manner, but with clearance. This ensures that the switching mechanism unit does not accidentally disengage from the switching mechanism housing, even while the switching mechanism is stored in bulk.

According to a further refinement, the switching mechanism housing comprises a side wall forming the housing peripheral side, the free, upper portion of which is bent over and forms the first housing side.

The switching mechanism unit can be produced very easily in this way by flanging the upper portion of the side wall. This bent-over upper portion of the side wall then at least partially surrounds the switching mechanism unit from the first housing side. However, as already mentioned, the first housing side is partially open, since the bent-over upper portion of the side wall does not cover the entire first housing side, but leaves an opening free at this side, through which the contact member is accessible from outside the switching mechanism housing. The opening preferably forms a central part in the middle of the first housing side. A free, circumferential edge of this bent-over upper portion of the side wall may radially delimit the opening According to a further refinement, the bimetal snap-action disc is configured to snap from a geometrically stable low temperature configuration to a geometrically stable high temperature configuration upon exceeding a response temperature, wherein the bimetal snap-action disc in its low temperature configuration is spaced from an inner surface of the bent-over portion arranged inside the switching mechanism housing and in its high temperature configuration bears against the inner surface of the bent-over portion.

The bent-over, upper portion of the side wall forming the first housing side of the switch housing thus not only serves to captively hold the switching mechanism unit in the switch housing, but according to this refinement also functions at the same time as a support on which the bimetal snap-action disc in its high-temperature configuration is supported from the inside. This guarantees that the switching mechanism together with its switching mechanism housing can be used in a fully functional manner even without the outer switch housing. This is because the bimetal snap-action disc in its high-temperature configuration can support itself against the switching mechanism housing, so that the contact member, which is connected to the bimetal snap-action disc, can move within the switching mechanism housing when the bimetal snap-action disc snaps over. A functional check of the switching mechanism unit can therefore easily be carried out even before the switching mechanism unit is installed in the switch.

The two mentioned configurations of the bimetal snap-action disc refer to different geometric positions of the bimetal snap-action disc. In the low-temperature configuration or the low-temperature position, the bimetal snap-action disc is preferably convexly curved on its upper side. In the high-temperature configuration or the high-temperature position, the bimetal snap-action disc is preferably concavely curved on its upper side.

According to a further refinement, the switching mechanism housing is formed in one piece. It thus preferably consists of a single piece from which all housing sides are integrally formed. This reduces the total number of parts and thus the costs. At the same time, this contributes to a very pressure-stable design of the switching mechanism. This is advantageous not only during storage of the switching mechanism as a bulk material, but also in the ultimately installed state in which the switching mechanism is installed in the temperature-dependent switch.

According to a further refinement, the switching mechanism housing comprises an electrically conductive material. Preferably, the switching mechanism is made of an electrically conductive material. Particularly preferably, this electrically conductive material is a metal.

This refinement makes it possible to use the switching mechanism housing as a current-carrying component of the temperature-dependent switch. In principle, it is also possible to use the switching mechanism housing itself in the temperature-dependent switch as one of the two electrical contacts. This simplifies the design of the switch and enables a very simple electrical connection.

According to a further refinement, the switching mechanism housing comprises a dome-shaped or pot-shaped portion forming at least a part of the second housing side. This dome- or pot-shaped portion preferably forms a centrally arranged part of the second housing side.

The dome or pot-shaped portion guarantees freedom of movement for the switching mechanism unit located in the switching mechanism housing. This provides space for the contact member in a simple and space-saving manner when it moves within the switching mechanism housing when the bimetal snap-action disc snaps from its low-temperature configuration to its high-temperature configuration.

According to a further refinement, the switch housing is rotationally symmetrical about a central axis. This simplifies the installation of the switching mechanism together with its switching mechanism housing in an (outer) switch housing of the temperature-dependent switch, since the switching mechanism can be inserted into the temperature-dependent switch in various positions rotated around the central axis. In addition, the rotationally symmetrical design of the switch housing enables an equally distributed force distribution in all directions (radial directions).

According to a further refinement, the bimetal snap-action disc comprises a first through hole and the snap-action spring disc comprises a second through hole, wherein the contact member passes through the first through hole and the second through hole, wherein contact member further comprises a support shoulder projecting radially from the base body, a first locking element arranged on a first side of the support shoulder, and a second locking element arranged on a second side of the support shoulder opposite the first side. The bimetal snap-action disc is arranged between the first locking element and the support shoulder and is held captive but with clearance on the contact member by the first locking element and the support shoulder. The snap-action spring disc is arranged between the second locking element and the support shoulder and is held captive but with play on the contact member by the second locking element and the support shoulder.

The locking elements may each be one or more retaining claws which project radially from the base body of the contact member. Alternatively, the locking elements can each comprise a flanged collar that extends circumferentially around the base body of the contact member. Both the retaining claws and this flanged collar can form individual circumferential portions of the base body or can extend around the entire circumference of the base body. In this way, the two snap-action discs are held captive, but with clearance, on the base body.

The locking elements for holding and locking the bimetal snap-action disc and the snap-action spring disc are preferably integrally connected to the base body of the contact member, wherein they can be produced by forming a respective part of the base body. The contact member is thus formed in one piece, and the base body of the contact member is integrally connected to the support shoulder and the locking elements. Overall, the contact member, the bimetal snap-action disc and the snap-action spring disc can thus be used to form a switching mechanism unit consisting of only three parts, which switching mechanism unit is realized as a captive unit.

The three-part design of the switching mechanism unit has both the advantage of as few as possible necessary components and the advantage of a mechanically stable and resistant design of the switching mechanism.

According to a further refinement, the first through hole is arranged centrally in the bimetal snap-action disc. Likewise, the second through hole is preferably arranged centrally in the snap-action spring disc.

The bimetal snap-action disc and the snap-action spring disc are preferably each circular disc-shaped. Furthermore, the bimetal snap-action disc and the snap-action spring disc are preferably each bistable.

"Bistable" in this respect means that both snap-action discs each have two different, stable geometric configurations/positions, wherein the two stable configurations/positions of the bimetal snap-action disc are temperature-dependent and the two stable configurations/positions of the snap-action spring disc are temperature-independent. This has the effect that the two snap-action discs remain stable in their respective positions after they have snapped over from one configuration to the other, without any undesired snapping back. Thus, the switching mechanism only snaps over upon exceeding the response temperature of the bimetal snap-action disc is exceeded and when the return temperature of the bimetal snap-action disc is undershot. The snap-action spring disc then snaps over together with the bimetal snap-action disc into its respective other configuration/position.

It is to be understood that the above features and those yet to be explained below can be used not only in the combination indicated in each case, but also in other combinations or on their own, without departing from the spirit and scope of the present disclosure.

DETAILED DESCRIPTION OF PREFERRED EMBODIMENTS

Figure 1:
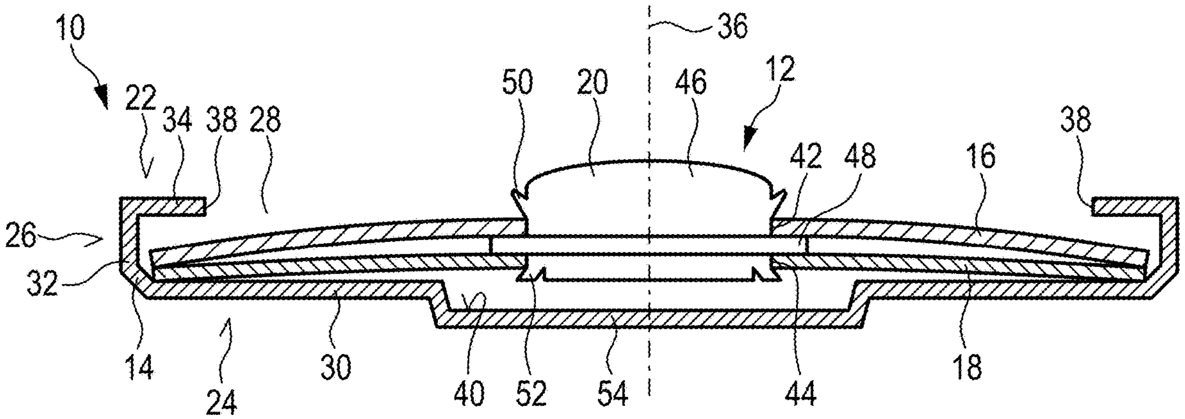
FIG. 1 a schematic sectional view of the temperature-dependent switching mechanism according to a first embodiment.
Figure 2:
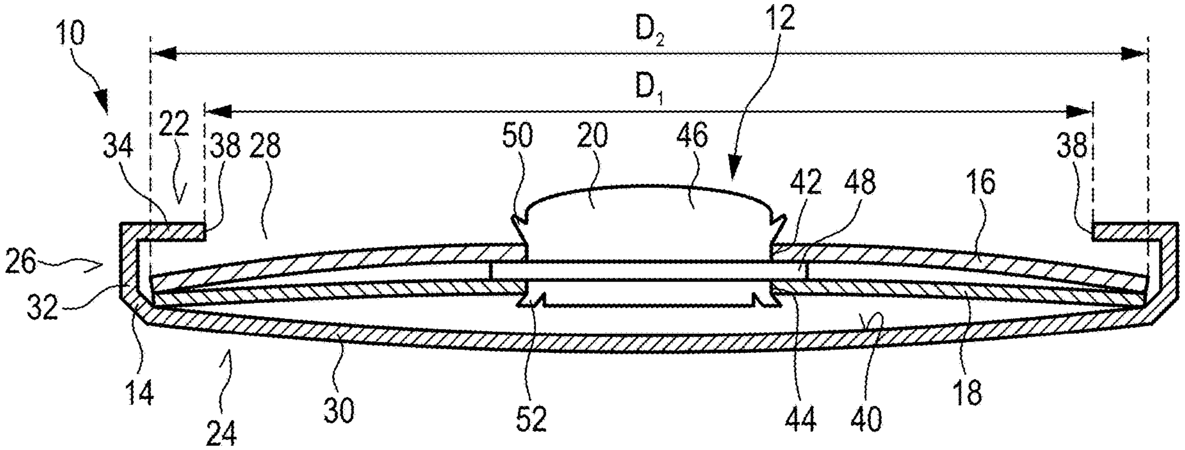
FIG. 2 a schematic sectional view of the temperature-dependent switching mechanism according to a second embodiment.

FIGS. 1-2 show two different embodiments of the switching mechanism, each in a schematic sectional view. In each case, the switching mechanism is denoted in its entirety by the reference numeral 10.

The switching mechanism 10 is a temperature-dependent switching mechanism. It comprises a functional switching mechanism unit 12 and a switching mechanism housing 14 surrounding this switching mechanism unit 12. The switching mechanism housing 14 surrounds the switching mechanism unit 12 from all six spatial directions, at least partially in each case. However, as will be explained in detail below, the switching mechanism housing 14 is configured as a partially open housing so that the switching mechanism unit 12 is accessible from at least one spatial direction, preferably from only one spatial direction, from outside the switching mechanism housing 14.

Due to the fact that the switching mechanism housing 14 at least partially surrounds the switching mechanism unit 12 from all six spatial directions, the switching mechanism unit 12 is captively held in the switching mechanism housing 14. As long as the switching mechanism 10 is not inserted into a temperature-dependent switch, there is preferably some clearance between the switching mechanism unit 12 and the switching mechanism housing 14. The switching mechanism unit 12 is movable within the switching mechanism housing 14 when the switching mechanism 10 is in the low temperature position.

The switching mechanism unit 12 is constructed in three parts. The switching mechanism unit 12 comprises a temperature-dependent bimetal snap-action disc 16, a temperature-independent snap-action spring disc 18 and a contact member 20. The bimetal snap-action disc 16 and the snap-action spring disc 18 are captively held on the contact member 20.

The switching mechanism unit 12 can thus be pre-produced as a semi-finished product and then inserted as a whole into the switching mechanism housing 14. The switching mechanism 10 together with the switching mechanism unit 12 and the switching mechanism housing 14 then also form a semi-finished product for a temperature-dependent switch produced therefrom later.

Since both the three components 16, 18, 20 of the switching mechanism unit 12 are captive to each other and the switching mechanism unit 12 is captively held in the switching mechanism housing 14, the switching mechanism 10 can be held in bulk storage until it is installed in a temperature-dependent switch.

The switching mechanism housing 14 protects the fragile components of the switching mechanism unit 12, i.e. in particular the bimetal snap-action disc 16 and the snap-action spring disc 18, from damage during bulk storage. The insertion of the switching mechanism unit 12 into such a switching mechanism housing 14 also has the advantage that the switching mechanism 10 can be inserted in a very simple manner into a temperature-dependent switch to be manufactured. Due to this very simple handling of the switching mechanism, the assembly process of the temperature-dependent switch can be automated without more ado.

The switching mechanism housing 14 at least partially surrounds the switching mechanism unit 12 from a first housing side 22, a second housing side 24 opposite the first housing side 22, and a housing peripheral side 26 extending between and transverse to the first and second housing sides 22, 24, respectively. Preferably, the switching mechanism housing 14 completely surrounds the switching mechanism unit 12 from both the second housing side 24 and the housing peripheral side 26. Thus, the second housing side 24 and the housing peripheral side 26 preferably form closed housing sides of the switching mechanism housing 14. Only the first housing side 22 is a partially open housing side of the switching mechanism housing 14. In other words, the housing peripheral side 26 surrounds the switching mechanism unit 12 along the entire circumference, i.e., from a total of four mutually orthogonally aligned spatial directions. Furthermore, the switching mechanism housing 14 also completely surrounds the switching mechanism unit 12 from a further spatial direction, namely from a spatial direction aligned orthogonally to the second housing side 24. Only from the sixth spatial direction, which is aligned orthogonally to the first housing side 22, does the switching mechanism housing 14 only partially surround the switching mechanism unit 12.

At the first housing side 22, the switching mechanism housing 14 comprises an opening 28 through which the contact member 20 is accessible from outside the switching mechanism housing 14.

According to the two embodiments of the switching mechanism 10 shown in FIGS. 1 and 2, the contact member 20 permanently projects outward through the opening 28. However, depending on the design of the height of the switching mechanism housing 14, this does not necessarily have to be the case. In principle, it is sufficient if the contact member 20 is accessible from the outside through the opening 28 and the switching mechanism unit 12 is movable within the switching mechanism housing 14 in such a way that the contact member 20 projects outwardly through the opening 28 during a corresponding movement within the switching mechanism housing.

A diameter D1 of the opening 28 is smaller than a diameter D2, measured parallel thereto, of the bimetal snap-action disc 16 and/or the snap-action spring disc 18. Thus, although the contact member 20 is accessible from the outside through the opening 28, the bimetal snap-action disc 16 and the snap-action spring disc 18 cannot detach from the switching mechanism housing 14.

The switching mechanism housing 14 is of one-piece design and is made of an electrically conductive material, for example metal. It comprises a bottom wall 30 and a side wall 32 integrally connected to the bottom wall. The bottom wall 30 forms the second housing side 24 of the switching mechanism housing 14. The side wall 32 forms the housing peripheral side 26 of the switching mechanism housing 14. A free upper portion 34 of the side wall 32 is bent in a direction towards a central axis 36, which forms the longitudinal axis of the contact member 20. A free, circumferential edge 38 of this bent-over upper portion 34 radially delimits the opening 28 of the switching mechanism housing 14.

In the low-temperature position of the switching mechanism unit 10 shown in FIGS. 1 and 2, the snap-action spring disc 18 bears with its outer edge against the switching mechanism housing 14. More specifically, the snap-action spring disc 18 bears with its outer edge on an inner side 40 of the bottom wall 30 facing the switching mechanism unit 12. In this position of the switching mechanism unit 10, the snap-action spring disc 18 carries the contact member 20. The bimetal snap-action disc 16, on the other hand, is in this position of the switching mechanism mounted in the switching mechanism housing 14 more or less free of forces.

The two snap-action discs 16, 18 are preferably circular disc-shaped and each comprises a centrally arranged through hole 42, 44. The through hole 42 arranged centrally in the bimetal snap-action disc 16 is referred to as the first through hole. The through hole 44 arranged in the snap-action spring disc 18 is referred to as the second through hole.

The two snap-action discs 16, 18 are slipped over the contact member 20 from opposite sides with their respective through hole 42, 44. The contact member 20 thus penetrates both snap-action discs 16, 18 at a central position.

The contact member 20 comprises a base body 46, which is preferably solid and made of an electrically conductive material. The base body 46 is passed through the two through holes 42, 44.

Approximately in the middle, i.e. at about half the height, the contact member 20 comprises a support shoulder 48 projecting radially from the base body 46. The two snap-action discs 16, 18 rest against this support shoulder 48 from opposite sides. The bimetal snap-action disc 16 is arranged on a first side of the support shoulder 48, which in FIGS. 1 and 2 forms the upper side of the support shoulder 48. The snap-action spring disc 18 is arranged on a second side of the support shoulder 48 opposite the first side, which second side forms the bottom side of the support shoulder 48 in FIGS. 1 and 2.

Further, locking elements 50, 52 are formed on the contact member 20, with the aid of which the two snap-action discs 16, 18 are held on the contact member 20. The two locking elements 50, 52 project radially from the base body 46 of the contact member 20. The first locking element 50 is arranged on the first side of the support shoulder 48. The second locking element 52 is arranged on the opposite second side of the support shoulder 48.

The bimetal snap-action disc 16 is arranged between the first locking element 50 and the support shoulder 48, and is held captive to the contact member 20 due to the radial projection of the first locking element 50 and the support shoulder 48 between the first locking element 50 and the support shoulder 48.

The snap-action spring disc 18 is arranged between the second locking element 52 and the support shoulder 48, and is held captive to the contact member 20 due to the radial projection of the second locking element 52 and the support shoulder 48 between the second locking element 52 and the support shoulder 48.

The contact member 20 is formed in one piece together with the support shoulder 48 and the two locking elements 50, 52. The support shoulder 48 and the two locking elements 50, 52 are therefore integral with the base body 46 of the contact member 20.

In the embodiments shown in FIGS. 1 and 2, the two locking elements 50, 52 are each configured as a circumferential collar. The circumferential collar forming the first locking element 50 projects upward at an angle radially from the base body 46 of the contact member 20. The collar forming the second locking element 52 projects downward at an angle radially from the base body 46 of the contact member 20.

Both collars can be formed relatively easily by forming a circumferential cut notch in the contact member 20. The cut notches are formed in the contact member after the two snap-action discs 16, 18 with their through holes 40, 42 have been slipped over the contact member 20.

As an alternative to such collars, which are produced by introducing cut notches, the two locking elements 50, 52 can also each comprise one or more retaining claws (not shown). Such retaining claws are also preferably integral with the base body 46 of the contact member 20.

It is advantageous for the function of the switching mechanism 10 if the bimetal snap-action disc 16 is held on the contact member 20 with larger clearance than the snap-action spring disc 18. This guarantees sufficiently free movement of the bimetal snap-action disc 16. At the same time, the slightly smaller clearance between the snap-action spring disc 18 and the contact member 20 enables the best possible electrical contact between these two components.

The two embodiments of the switching mechanism 10 shown in FIGS. 1 and 2 differ mainly in the shape of the switching mechanism housing 14. In the embodiment shown in FIG. 1, the bottom wall 30, which forms the second housing side 24 of the switching mechanism housing 14, is of essentially plate-like design and comprises a cup-like bulge 54 in a central portion. In contrast, in the embodiment shown in FIG. 2, the bottom wall 30 has an arcuate configuration in section. The bottom wall 30 of the switching mechanism housing 14 thus forms a kind of convex dome.

Of course, other shapes of the switching mechanism housing 14 are possible. However, the contact member 20 should be able to move downward within the switching mechanism housing 14 when the snap-action discs 16, 18 snap over from the low-temperature position shown in FIGS. 1 and 2 to the high-temperature position. For this purpose, there must be sufficient space in particular for the contact member 20 so that it does not collide with the bottom wall 30 in the high-temperature position of the switching mechanism 10.

Figure 3:
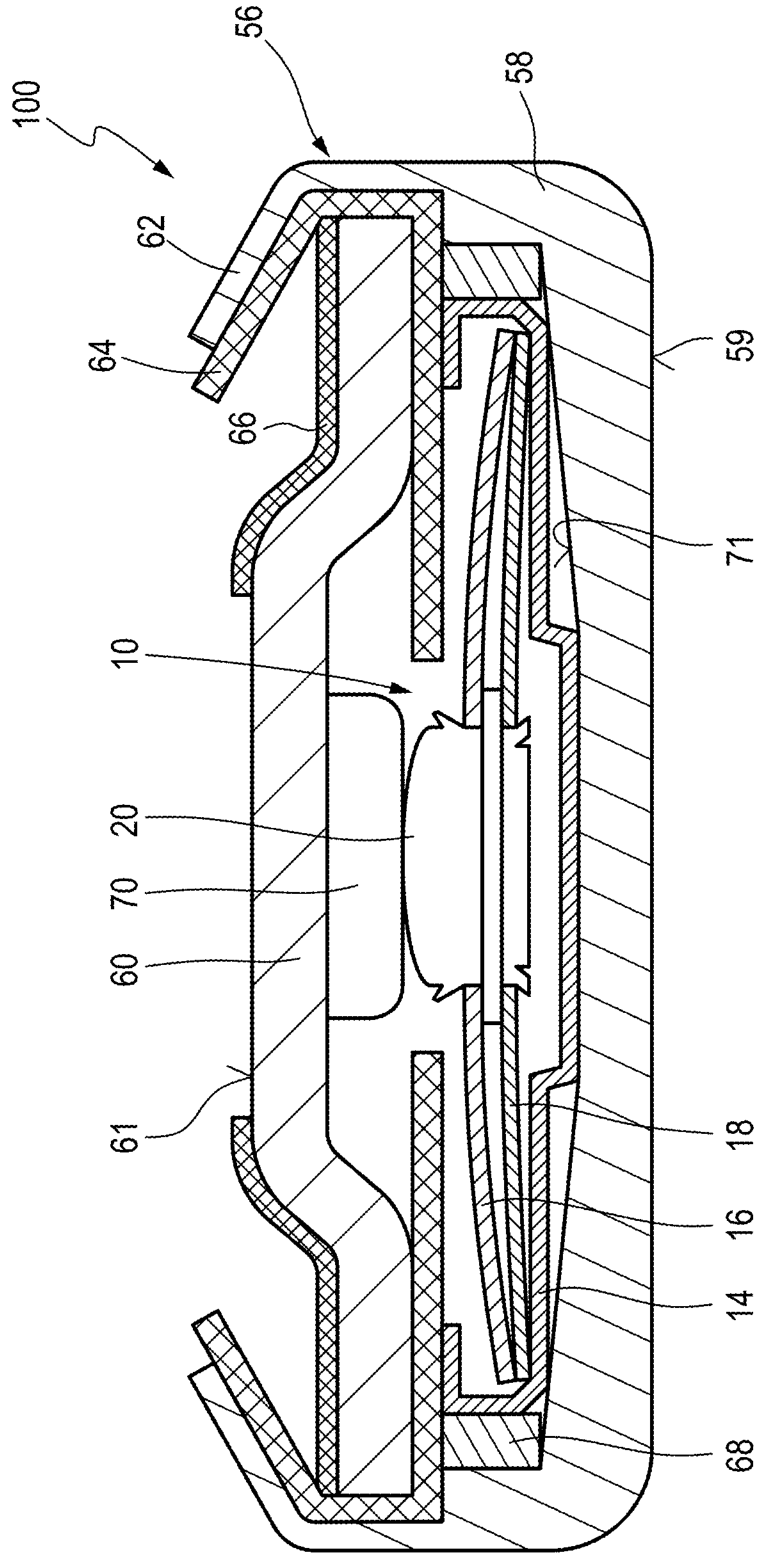
FIG. 3 a schematic sectional view of the temperature-dependent switch according to an embodiment, wherein the switch is in its low-temperature position.
Figure 4:
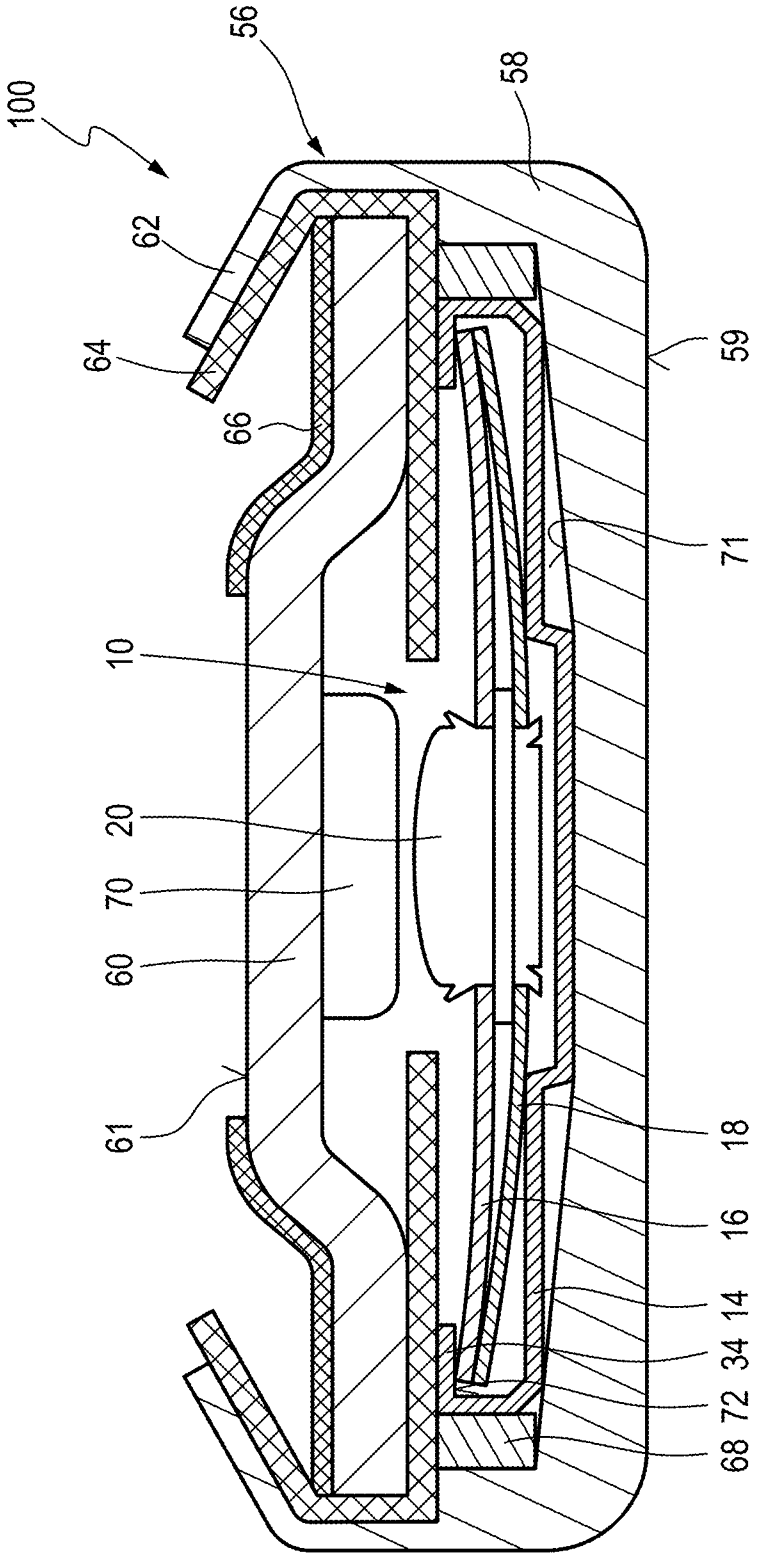
FIG. 4 a schematic sectional view of the temperature-dependent switch shown in FIG. 3, wherein the switch is in its high-temperature position.

In FIGS. 3 and 4, an embodiment of a temperature-dependent switch in which the switching mechanism 10 can be used is shown in each case in a schematic sectional view. The switch is denoted therein in its entirety by reference numeral 100.

FIG. 3 shows the low-temperature position of the switch 100. FIG. 4 shows the high-temperature position of the switch 100.

According to the embodiment shown in FIGS. 3 and 4, the switch 100 comprises a switch housing 56 which functions as a housing for the switching mechanism 10. The switching mechanism 10 is inserted into the switch housing 56 together with its switching mechanism housing 14. The switching mechanism 10 corresponds to the embodiment shown in FIG. 1.

The switch housing 56 comprises a pot-like lower part 58 and a lid part 60 held to the lower part 58 by a folded or flanged edge 62.

Both the lower part 58 and the lid part 60 are made of an electrically conductive material, preferably metal, in the embodiment shown in FIGS. 3 and 4. An insulating foil 64 is arranged between the lower part 58 and the lid part 60. The insulating foil 64 provides electrical insulation of the lower part 58 with respect to the lid part 60. Likewise, the insulating foil 64 provides a mechanical seal that prevents liquids or contaminants from entering the interior of the housing from outside.

Since the lower part 58 and the lid part 60 are each made of electrically conductive material, thermal contact can be made via their outer surfaces to an electrical device to be protected. The outer surfaces also serve as the external electrical connection of the switch 100. For example, the outer surface 61 of the lid part 60 can act as the first electrical connection and the outer surface 59 of the lower part 58 can act as the second electrical connection.

A further insulation layer 66 may be arranged on the outside of the lid part 60, as shown in FIGS. 3 and 4.

The switching mechanism 10 is arranged clamped between the lower part 58 and the lid part 60. A spacer ring 68, against which the switching mechanism housing 14 rests circumferentially, is used to position the switching mechanism 10. The contact member 20 should be aligned with respect to a counter contact 70, which is arranged on the inside of the lid part 60. This counter contact 70 is also referred to herein as the first stationary contact. The inner side 71 of the lower part 58 serves as the second stationary contact.

In the low temperature position of the switch 100 shown in FIG. 3, the temperature-independent snap-action spring disc 18 is in its first configuration and the temperature-dependent bimetal snap-action disc 16 is in its low temperature configuration. The snap-action spring disc 18 presses the contact member 20 against the counter contact 70, and the switch 100 is thus in its closed position in which an electrically conductive connection is established between the first stationary contact 70 and the second stationary contact 71 via the contact member 20 and the snap-action spring disc 18. Contact pressure between the contact member 20 and the first stationary contact 70 is provided by the snap-action spring disc 18. In contrast, the bimetal snap-action disc 16 is mounted in the switching mechanism housing 14 in this state with virtually no force.

If the temperature of the device to be protected now increases, and thus the temperature of the switch 100 as well as the bimetal snap-action disc 16 arranged therein increases to the switching temperature of the bimetal snap-action disc 16 or above the switching temperature, the bimetal snap-action disc 16 snaps over from its convex low-temperature position shown in FIG. 3 to its concave high-temperature position shown in FIG. 4. During this snap-over, the outer edge of the bimetal snap-action disc 16 supports against the first housing side 22 of the switching mechanism housing 14. More specifically, the bimetal snap-action disc 16 bears against an inner surface 72 of the bent-over upper portion 34 arranged inside the switching mechanism housing 14. As a result, the snap-action spring disc 18 simultaneously flexes downward at its center, causing the snap-action spring disc 18 to snap over from its first stable geometric configuration shown in FIG. 3 to its second stable geometric configuration shown in FIG. 4.

FIG. 4 shows the high-temperature position of the switch 100, in which it is open. The circuit is thus interrupted.

When the device to be protected and thus the switch 100 together with the bimetal snap-action disc 16 then cool down again, the bimetal snap-action disc 16 snaps back into its low-temperature position upon reaching the reset temperature, which is also referred to as the snap-back temperature, as shown in FIG. 3, for example. Thus, a reversible switching behavior can be realized.

Of course, it is also possible for the switch 100 to be prevented from switching back to the high-temperature position once it has been snapped over by means of a corresponding locking device. A large number of such locking devices, which are used in particular for one-time switches where a switch-back is to be prevented, are already known from the prior art.

Figure 5:
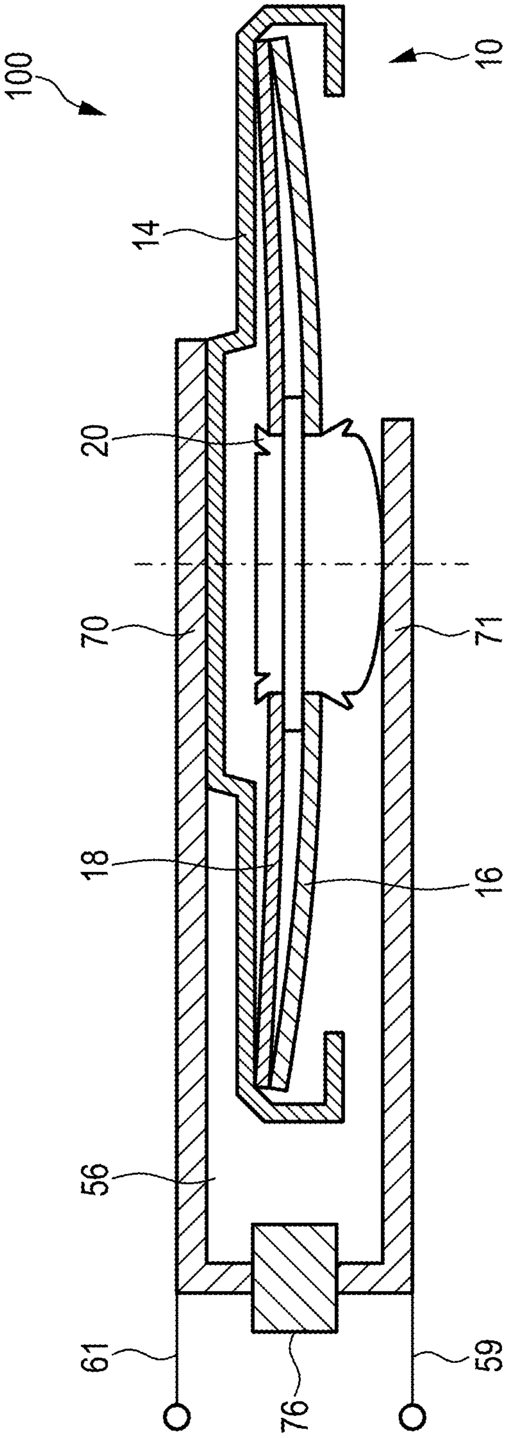
FIG. 5 a schematic sectional view of another embodiment of the temperature-dependent switch, wherein the switch is in its low-temperature position.

FIG. 5 shows a further embodiment of the switch 100. Compared to the switch housing 56 shown in FIGS. 3 and 4, the switch housing 56 here has a much simpler design. It comprises only one contact 70, which is connected to a first electrical terminal 61, and a second contact 71, which is connected to a second terminal 59. The two contacts 70, 71 are configured as simple metal sheets which are connected to each other via an insulator 76. The insulator 76 electrically separates the two contacts 70, 71 from each other and at the same time provides a mechanical connection between the two contacts 70, 71.

In the embodiment shown in FIG. 5, the switching mechanism 10 is merely inserted between the two contacts 70, 71. However, the switch housing 56 has a partially open design here and, unlike the embodiment shown in FIGS. 3 and 4, is not hermetically sealed.

The switch housing 56 of the switch 100 according to the embodiment shown in FIG. 5 may, for example, be directly integrated into a device to be monitored by the switch 100. The simple design of the switch housing 56 shown in FIG. 5 is intended to illustrate in principle that the switching mechanism 10 can also be integrated into substantially simpler switch housings 56 due to its structural design. The reason for this is in particular that the switching mechanism 10 is already fully functional in itself due to the switching mechanism housing 14, in which the switching mechanism unit 12 is captively mounted. Insofar as certain applications do not require hermetic sealing of the switch 100, all that is required on the switch housing 56 are two contacts 70, 71, between which the switching mechanism unit 10 is arranged clamped. No other components are required on the switch housing 56 except for the electrical terminals 59, 61 connected to the contacts 70, 71.

It is understood that the switching mechanism 10 can be used in switch housings of completely different designs.

What is claimed is:

1. A temperature-dependent switching mechanism for a temperature-dependent switch, comprising:

a temperature-dependent bimetal snap-action disc that is configured to snap from a low temperature configuration to a high temperature configuration upon exceeding a response temperature;

a temperature-independent snap-action spring disc;

an electrically conductive contact member to which the temperature-dependent bimetal snap-action disc and the temperature-independent snap-action spring disc are captively held, so that the temperature-dependent bimetal snap-action disc, the temperature-independent snap-action spring disc, and the electrically conductive contact member form a switching mechanism unit captively held together; and a switching mechanism housing in which the switching mechanism unit is arranged and which captively holds the switching mechanism unit, wherein the switching mechanism housing is formed in one piece from an electrically conductive material and surrounds the switching mechanism unit from a first housing side, a second housing side opposite the first housing side, and a housing peripheral side extending between and transverse to the first and second housing sides, wherein the switching mechanism housing comprises a side wall forming the housing peripheral side, wherein a free, upper portion of the side wall is bent over and forms the first housing side, wherein the switching mechanism housing is configured as an at least partially open housing and comprises an opening on the first housing side through which the electrically conductive contact member is accessible from outside the switching mechanism housing, and wherein the temperature-dependent bimetal snap-action disc in its low temperature configuration is spaced from an inner surface of the free, upper portion of the side wall arranged inside the switching mechanism housing and in its high temperature configuration bears against the inner surface.

2. The temperature-dependent switching mechanism according to claim 1, wherein the electrically conductive contact member permanently protrudes outwardly through the opening or is movable together with the temperature-dependent bimetal snap-action disc and the temperature-independent snap-action spring disc within the switching mechanism housing such that the electrically conductive contact member protrudes outwardly through the opening upon a corresponding movement within the switching mechanism housing.

3. The temperature-dependent switching mechanism according to claim 1, wherein a diameter of the opening is smaller than a diameter of the temperature-dependent bimetal snap-action disc measured parallel to the diameter of the opening and/or smaller than a diameter of the temperature-independent snap-action spring disc measured parallel to the diameter of the opening.

4. The temperature-dependent switching mechanism according to claim 1, wherein the switching mechanism housing comprises a dome-shaped portion or a pot-shaped portion forming at least a part of the second housing side.

5. The temperature-dependent switching mechanism according to claim 4, wherein the switching mechanism housing is rotationally symmetrical about a central axis, and wherein the dome-shaped portion or the pot-shaped portion forms a centrally arranged part of the second housing side.

6. The temperature-dependent switching mechanism according to claim 1, wherein the switching mechanism housing is rotationally symmetrical about a central axis.

7. The temperature-dependent switching mechanism according to claim 6, wherein the switching mechanism unit is rotationally symmetrical about the central axis.

8. The temperature-dependent switching mechanism according to claim 1, wherein the temperature-dependent bimetal snap-action disc comprises a first through hole and the temperature-independent snap-action spring disc comprises a second through hole, wherein the electrically conductive contact member passes through the first through hole and the second through hole, wherein the electrically conductive contact member further comprises a radially projecting support shoulder, a first locking element arranged on a first side of the radially projecting support shoulder, and a second locking element arranged on a second side of the radially projecting support shoulder opposite the first side, wherein the temperature-dependent bimetal snap-action disc is arranged between the first locking element and the radially projecting support shoulder and is held captive on the electrically conductive contact member by the first locking element and the radially projecting support shoulder, and wherein the temperature-independent snap-action spring disc is arranged between the second locking element and the radially projecting support shoulder and is held captive on the electrically conductive contact member by the second locking element and the radially projecting support shoulder.

9. The temperature-dependent switching mechanism according to claim 8, wherein the first through hole is arranged centrally in the temperature-dependent bimetal snap-action disc, and wherein the second through hole is arranged centrally in the temperature-independent snap-action spring disc.

10. The temperature-dependent switching mechanism according to claim 1, wherein the temperature-dependent bimetal snap-action disc and the temperature-independent snap-action spring disc are each circular disc-shaped.

11. A temperature-dependent switch comprising:

a temperature-dependent switching mechanism; and a switch housing surrounding the temperature-dependent switching mechanism and comprising a first contact and a second contact;

wherein the temperature-dependent switching mechanism comprises:

a temperature-dependent bimetal snap-action disc that is configured to snap from a low temperature configuration to a high temperature configuration upon exceeding a response temperature;

a temperature-independent snap-action spring disc;

an electrically conductive contact member to which the temperature-dependent bimetal snap-action disc and the temperature-independent snap-action spring disc are captively held, so that the temperature-dependent bimetal snap-action disc, the temperature-independent snap-action spring disc, and the electrically conductive contact member form a switching mechanism unit captively held together; and a switching mechanism housing in which the switching mechanism unit is arranged and which captively holds the switching mechanism unit, wherein the switching mechanism housing is formed in one piece from an electrically conductive material and surrounds the switching mechanism unit from a first housing side, a second housing side opposite the first housing side, and a housing peripheral side extending between and transverse to the first and second housing sides, wherein the switching mechanism housing comprises a side wall forming the housing peripheral side, wherein a free, upper portion of the side wall is bent over and forms the first housing side, wherein the switching mechanism housing is configured as an at least partially open housing and comprises an opening on the first housing side through which the electrically conductive contact member is accessible from outside the switching mechanism housing, wherein the temperature-dependent switching mechanism is configured to establish an electrical connection between the first contact and the second contact below a response temperature of the temperature-dependent bimetal snap-action disc and to interrupt the electrical connection upon exceeding the response temperature, and wherein the temperature-dependent bimetal snap-action disc in its low temperature configuration is spaced from an inner surface of the free, upper portion of the side wall arranged inside the switching mechanism housing and in its high temperature configuration bears against the inner surface.

12. The temperature-dependent switch according to claim 11, wherein the electrically conductive contact member permanently protrudes outwardly through the opening or is movable together with the temperature-dependent bimetal snap-action disc and the temperature-independent snap-action spring disc within the switching mechanism housing such that the electrically conductive contact member protrudes outwardly through the opening upon a corresponding movement within the switching mechanism housing.

13. The temperature-dependent switch according to claim 11, wherein a diameter of the opening is smaller than a diameter of the temperature-dependent bimetal snap-action disc measured parallel to the diameter of the opening and/or smaller than a diameter of the temperature-independent snap-action spring disc measured parallel to the diameter of the opening.

14. A temperature-dependent switching mechanism for a temperature-dependent switch, comprising:

a temperature-dependent bimetal snap-action disc;

a temperature-independent snap-action spring disc;

an electrically conductive contact member to which the temperature-dependent bimetal snap-action disc and the temperature-independent snap-action spring disc are connected, so that the temperature-dependent bimetal snap-action disc, the temperature-independent snap-action spring disc, and the electrically conductive contact member form a switching mechanism unit held together; and a switching mechanism housing in which the switching mechanism unit is arranged and which holds the switching mechanism unit, wherein the switching mechanism housing is formed in one piece from an electrically conductive material and surrounds the switching mechanism unit from a first housing side, a second housing side opposite the first housing side, and a housing peripheral side extending between and transverse to the first and second housing sides, wherein the switching mechanism housing is configured as an at least partially open housing and comprises an opening on the first housing side through which the electrically conductive contact member is accessible from outside the switching mechanism housing, wherein the electrically conductive contact member protrudes outwardly through the opening or is movable together with the temperature-dependent bimetal snap-action disc and the temperature-independent snap-action spring disc within the switching mechanism housing such that the electrically conductive contact member protrudes outwardly through the opening upon a corresponding movement within the switching mechanism housing, and wherein a diameter of the opening is smaller than a diameter of the temperature-dependent bimetal snap-action disc measured parallel to the diameter of the opening and smaller than a diameter of the temperature-independent snap-action spring disc measured parallel to the diameter of the opening.

15. The temperature-dependent switching mechanism according to claim 14, wherein the switching mechanism housing comprises a dome-shaped portion or a pot-shaped portion forming at least a part of the second housing side.

16. The temperature-dependent switching mechanism according to claim 15, wherein the switching mechanism housing is rotationally symmetrical about a central axis, and wherein the dome-shaped portion or the pot-shaped portion forms a centrally arranged part of the second housing side.

17. The temperature-dependent switching mechanism according to claim 14, wherein the switching mechanism housing is rotationally symmetrical about a central axis.

18. The temperature-dependent switching mechanism according to claim 17, wherein the switching mechanism unit is rotationally symmetrical about the central axis.

19. The temperature-dependent switching mechanism according to claim 14, wherein the temperature-dependent bimetal snap-action disc comprises a first through hole and the temperature-independent snap-action spring disc comprises a second through hole, wherein the electrically conductive contact member passes through the first through hole and the second through hole, wherein the electrically conductive contact member further comprises a radially projecting support shoulder, a first locking element arranged on a first side of the radially projecting support shoulder, and a second locking element arranged on a second side of the radially projecting support shoulder opposite the first side, wherein the temperature-dependent bimetal snap-action disc is arranged between the first locking element and the radially projecting support shoulder and is held on the electrically conductive contact member by the first locking element and the radially projecting support shoulder, and wherein the temperature-independent snap-action spring disc is arranged between the second locking element and the radially projecting support shoulder and is held on the electrically conductive contact member by the second locking element and the radially projecting support shoulder.

20. The temperature-dependent switching mechanism according to claim 19, wherein the first through hole is arranged centrally in the temperature-dependent bimetal snap-action disc, and wherein the second through hole is arranged centrally in the temperature-independent snap-action spring disc.

* * * * *